(12) United States Patent
Certilange et al.

(10) Patent No.: US 10,823,008 B2
(45) Date of Patent: Nov. 3, 2020

(54) TURBOCHARGER HAVING A MERIDIONALLY DIVIDED TURBINE HOUSING

(71) Applicant: Honeywell International Inc., Morris Plains, NJ (US)

(72) Inventors: Fabien Certilange, Munich (DE); Roman Kolacek, Brno (CZ); Martin Babak, Velka Bites (CZ); Dusan Chadim, Brno (CZ); Farid Ahdad, Thaon les Vosges (FR); Pavel Dubsik, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 63 days.

(21) Appl. No.: 15/976,915

(22) Filed: May 11, 2018

(65) Prior Publication Data
US 2019/0345842 A1 Nov. 14, 2019

(51) Int. Cl.
*F01D 25/24* (2006.01)
*F02B 37/00* (2006.01)
*F02C 6/12* (2006.01)

(52) U.S. Cl.
CPC .............. *F01D 25/24* (2013.01); *F02B 37/00* (2013.01); *F02C 6/12* (2013.01); *F05D 2220/40* (2013.01)

(58) Field of Classification Search
CPC ......... F01D 25/24; F05D 2250/51; F02C 6/12
See application file for complete search history.

(56) References Cited

U.S. PATENT DOCUMENTS

| | | | |
|---|---|---|---|
| 3,614,259 A | 10/1971 | Neff | |
| 4,027,994 A | 6/1977 | Macinnes | |
| 4,179,892 A | 12/1979 | Deydrich | |
| 4,565,505 A * | 1/1986 | Woollenweber | F01D 25/16 417/407 |
| 4,825,523 A * | 5/1989 | Nakazawa | F01D 17/18 164/98 |
| 4,875,837 A * | 10/1989 | Usami | F01D 25/145 417/407 |
| 5,943,864 A | 8/1999 | Sumser et al. | |
| 6,260,358 B1 | 7/2001 | Daudel et al. | |
| 6,694,735 B2 | 2/2004 | Sumser et al. | |
| 6,709,235 B2 * | 3/2004 | Hosny | F01D 9/026 415/205 |

(Continued)

FOREIGN PATENT DOCUMENTS

| | | |
|---|---|---|
| DE | 102006022181 A1 | 11/2007 |
| DE | 102006022182 A1 | 11/2007 |

(Continued)

*Primary Examiner* — Ninh H. Nguyen
(74) *Attorney, Agent, or Firm* — John C. James

(57) ABSTRACT

A turbocharger has a meridionally divided scroll comprising a first scroll and a second. A dividing wall that separates the two scrolls from each other has an evolutive thickness distribution as a function of angular location about a rotational axis of the turbine. In an embodiment, the dividing wall has a V-shape, and the included angle of the V-shaped dividing wall varies from a maximum value at a 0° angular location to a minimum value at a 360° angular location. As such, the thickness of the dividing wall correspondingly varies from a maximum value at the 0° angular location to a minimum value at the 360° angular location.

1 Claim, 3 Drawing Sheets

(56) References Cited

U.S. PATENT DOCUMENTS

| | | | |
|---|---|---|---|
| 6,672,061 | B2 | 6/2004 | Schmid et al. |
| 6,941,755 | B2 | 4/2005 | Bucknell et al. |
| 8,353,161 | B2 | 1/2013 | Kares et al. |
| 2007/0180826 | A1 | 8/2007 | Sumser et al. |
| 2008/0000229 | A1 | 1/2008 | Kuespert et al. |
| 2009/0120087 | A1 | 5/2009 | Schmid et al. |
| 2011/0252790 | A1 | 10/2011 | Lotterman et al. |
| 2011/0252792 | A1 | 10/2011 | Kares et al. |
| 2015/0023788 | A1* | 1/2015 | Shoghi .................... F01D 25/24 415/208.1 |

FOREIGN PATENT DOCUMENTS

| | | | |
|---|---|---|---|
| JP | 62228627 | A | 10/1987 |
| WO | 2006018255 | A1 | 2/2006 |
| WO | 2017176186 | A1 | 10/2017 |

\* cited by examiner

TURBOCHARGER HAVING A MERIDIONALLY DIVIDED TURBINE HOUSING

BACKGROUND OF THE INVENTION

The present disclosure relates to turbochargers in which a turbine of the turbocharger is driven by exhaust gas from a reciprocating engine. The invention relates more particularly to turbine housings that are divided into a plurality of substantially separate sections each fed by a separate exhaust system.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

In multiple-piston reciprocating engines, it is known to design the exhaust system in such a manner as to take advantage of the pressure pulsation that occurs in the exhaust stream. In particular, it is known to employ what is known as "pulse separation" wherein the cylinders of the engine are divided into a plurality of subgroups, and the pulses from each subgroup of cylinders are substantially isolated from those of the other subgroups by having independent exhaust passages for each subgroup. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, the turbine housing into which the exhaust gases are fed is typically divided into a plurality of substantially separate parts.

There are two basic ways in which turbine housings have been divided: (1) meridional division, and (2) sector division. In a meridionally divided turbine housing, the scroll or chamber that surrounds the turbine wheel and into which the exhaust gases are fed is divided into a plurality of passages in the meridional plane such that each passage occupies substantially a full circumference and the passages succeed each other in the axial direction, such as shown in FIG. 4 of U.S. Pat. No. 4,027,994.

In a sector-divided turbine housing, the generally annular chamber is divided into angular sectors each of which occupies only a part of the circumference such that the passages succeed each other in the circumferential direction, such as shown in FIG. 2 of U.S. Pat. No. 6,260,358. The '358 patent also discloses fixed guide vanes that are positioned just radially inwardly of the chamber and guide the flow into the turbine wheel.

The present disclosure relates to turbochargers having a meridionally divided turbine housing.

SUMMARY OF THE DISCLOSURE

The present disclosure describes embodiments of turbochargers having a meridionally divided turbine housing. In accordance with an embodiment of the invention, a turbocharger comprises:

- a compressor comprising a compressor housing and a compressor wheel mounted in the compressor housing and connected to a rotatable shaft for rotation therewith;
- a turbine comprising a turbine housing and a turbine wheel mounted in the turbine housing and connected to the rotatable shaft for rotation therewith;
- the turbine housing defining a first inlet and a separate second inlet into which separate first and second exhaust gas streams are respectively received;
- a center housing connected between the compressor housing and the turbine housing and containing bearings for the shaft;
- the turbine housing defining a meridionally divided scroll surrounding the turbine wheel, the first and second inlets joining with the meridionally divided scroll at a location defined as a 0° angular location with respect to a circumferential direction about the turbine wheel, the meridionally divided scroll extending in the circumferential direction from the 0° angular location substantially to a 360° angular location, the meridionally divided scroll defining a first scroll that receives the first exhaust gas stream from the first inlet, and a separate second scroll that receives the second exhaust gas stream from the second inlet;
- a nozzle leading from the meridionally divided scroll generally radially inwardly to the turbine wheel; and
- wherein the turbine housing defines a dividing wall that meridionally divides the first scroll from the second scroll, wherein the dividing wall has a thickness T on any axial-radial cross-sectional plane through the turbine housing and passing through a rotational axis of the turbine wheel, the thickness T being measured at an average radius $R_{avg}$ of the dividing wall on said cross-sectional plane, wherein said thickness T varies from a maximum value at the 0° angular location to a minimum value at the 360° angular location.

In one embodiment of the invention, the dividing wall in axial-radial cross-section has a V-shape with an included angle $\beta$, the included angle $\beta$ varying from a maximum value at the 0° angular location to a minimum value at the 360° angular location.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
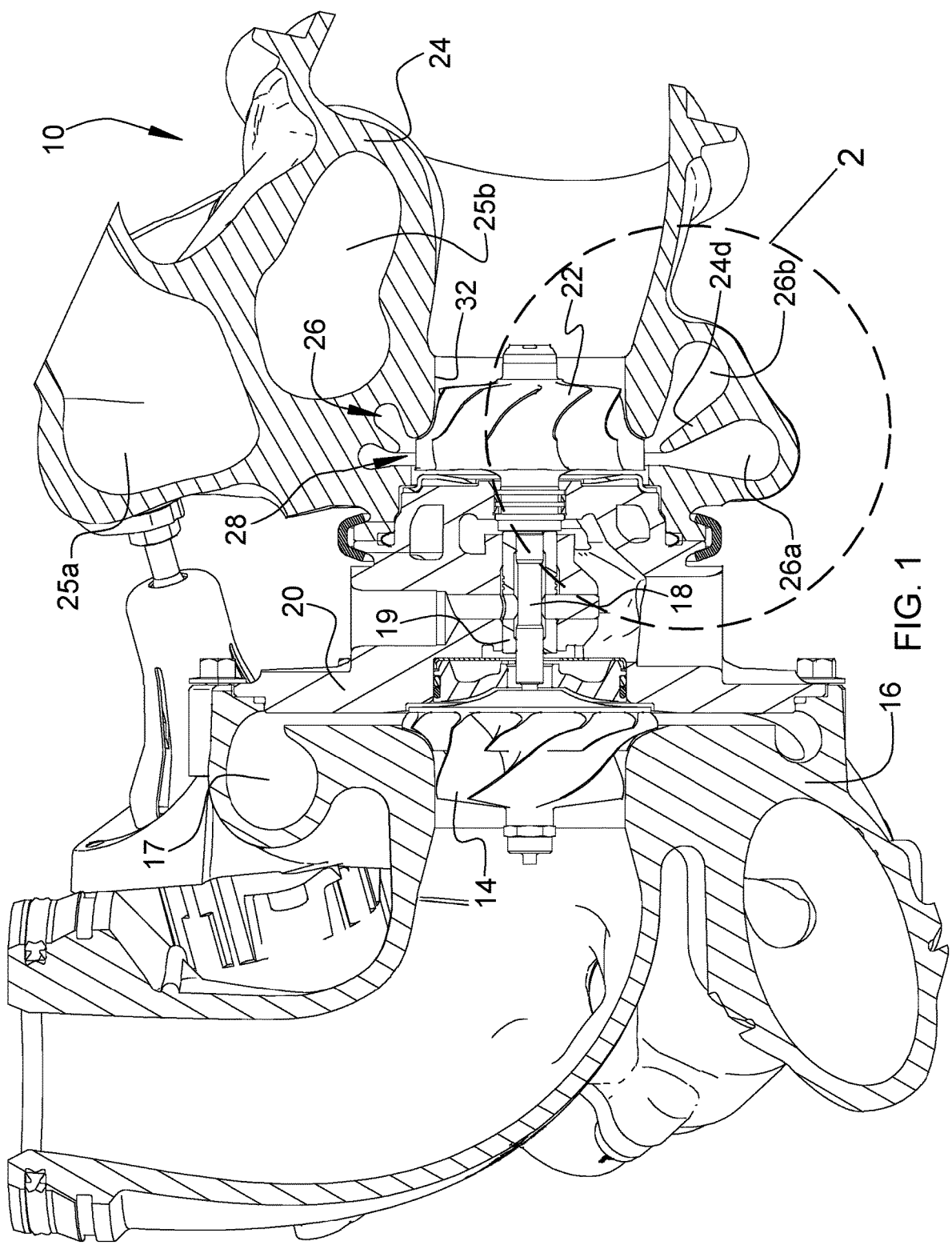
FIG. 1 is an axial cross-sectional view of a turbocharger in accordance with one embodiment of the present invention.

FIG. 1 illustrates a turbocharger 10 in accordance with one embodiment of the invention. The turbocharger includes a compressor wheel or impeller 14 disposed in a compressor housing 16 and mounted on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to a volute 17, which collects the compressed air for supply to the intake of an internal combustion engine (not shown) for boosting the performance of the engine.

The turbocharger also includes a turbine housing 24 that houses the turbine wheel 22. As previously noted, in reciprocating internal combustion engines having a plurality of cylinders, it is advantageous to design the exhaust system in such a manner as to take advantage of the pressure pulsation that occurs in the exhaust streams discharged from the cylinders. In particular, it is advantageous to employ what is known as "pulse separation" wherein the cylinders of the engine are divided into a plurality of subgroups, and the pulses from each subgroup of cylinders are substantially isolated from those of the other subgroups by having independent exhaust passages for each subgroup. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, in the embodiment of the invention, the turbine housing defines a first inlet 25a for receiving a first exhaust gas stream from a sub-set of the engine cylinders, and a separate second inlet 25b for receiving a second exhaust gas stream from another sub-set of the engine cylinders. The turbine housing also defines a meridionally divided scroll 26 formed as two completely separate first and second scrolls 26a and 26b, respectively, each of which extends substantially 360 degrees about the turbine wheel 22. The first scroll 26a receives exhaust gas from the first inlet 25a, and the second scroll 26b receives exhaust gas from the second inlet 25b. Exhaust gas from the scrolls 26a and 26b is fed by the nozzle 28 into the turbine wheel 22 for driving the turbine wheel, which in turn drives the compressor wheel 14.

The first and second inlets 25a,b join with the meridionally divided scroll 26 at a location defined as a 0° angular location with respect to a circumferential direction about the turbine wheel. The meridionally divided scroll extends in the circumferential direction from the 0° angular location substantially to a 360° angular location.

The turbine housing includes a dividing wall 24d that divides the scroll into the two separate scrolls. The dividing wall extends substantially 360° about the turbine. The present invention relates to a particular configuration of the dividing wall that has been found to be beneficial in terms of reduced thermal stresses that can cause cracking in the dividing wall over time.

Figure 2:
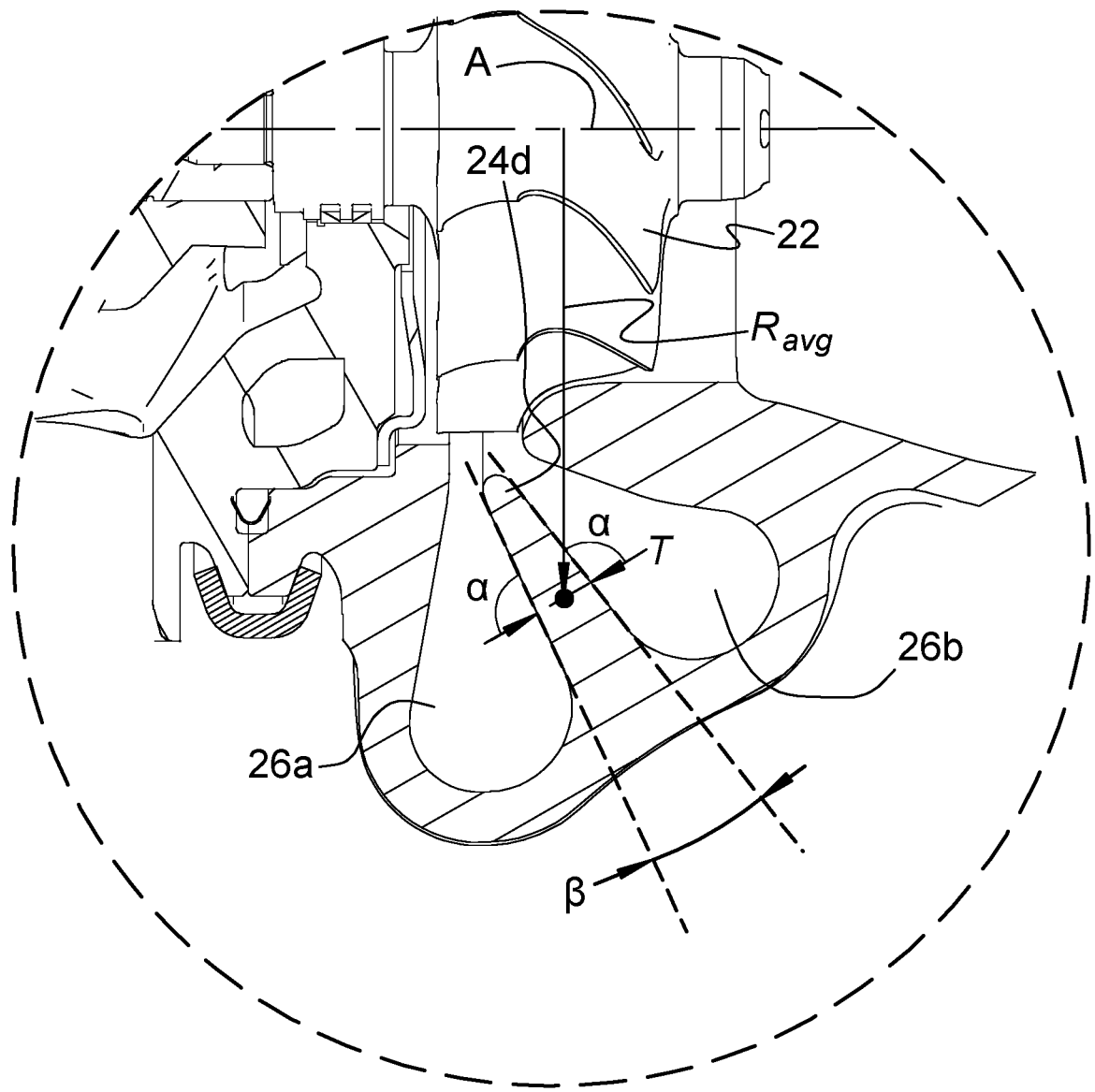
FIG. 2 is a portion of FIG. 1, magnified to illustrate in greater detail the dividing wall in accordance with the embodiment of the invention.

With reference to FIG. 2, the dividing wall 24d in the illustrated embodiment has a V-shape, tapering from a relatively larger thickness at a radially outer end (also called the "root end" herein) to a relatively smaller thickness at a radially inner end (also called the "tip end" herein) of the dividing wall. The taper angle, or included angle, is denoted as $\beta$ herein. The present description employs a parameter $R_{avg}$, defined as the average of the radius (from the rotational axis A of the turbine) of the dividing wall at its root end and the radius of the dividing wall at its tip end. The thickness of the dividing wall at said average radius $R_{avg}$ is denoted as T, as shown in FIG. 2. The thickness T is measured along a direction that is perpendicular to an imaginary line bisecting the dividing wall into two equal half-thicknesses. Thus, for example, when the length direction of the dividing wall is not oriented purely radially but has some axial component as well (as shown in FIG. 2), the thickness is not measured in the purely axial direction, but rather along a direction that has some radial component as well. Another way of stating this is to say that the thickness is measured along a line that makes the same angle $\alpha$ with each of the two opposite faces of the dividing wall. It will be recognized that $\alpha$ and $\beta$ are related as $\beta = 180° - 2\alpha$.

Figure 3:
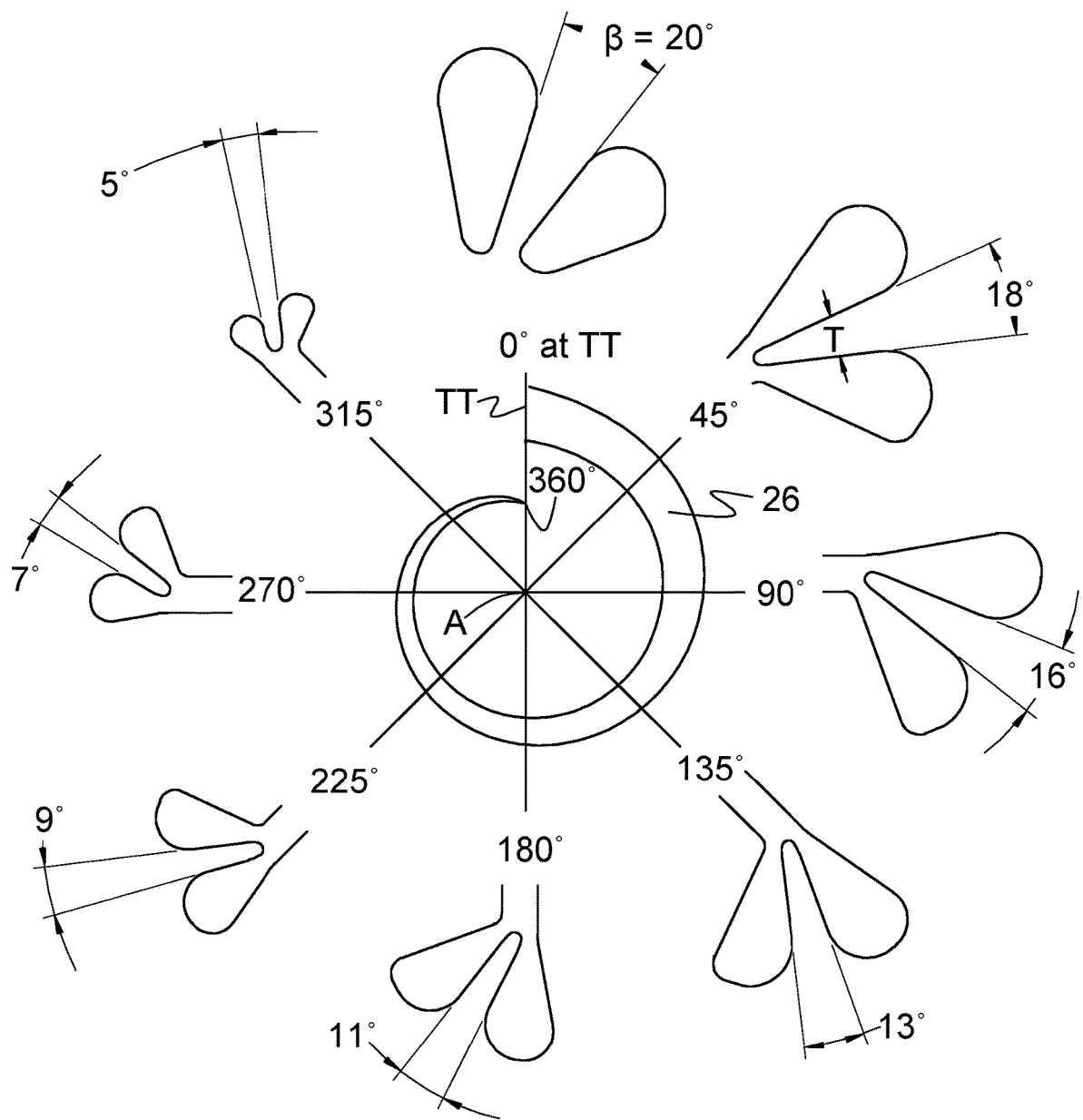
FIG. 3 is a diagrammatic depiction of a meridionally divided scroll viewed in the axial direction, on which is superimposed a series of axial-radial cross-sectional views through the scroll at various angular locations about the turbine wheel axis.

In accordance with embodiments of the invention, the distribution of the thickness T in the circumferential direction is an evolutive thickness distribution that varies from a maximum value at the 0° angular location to a minimum value at the 360° angular location. FIG. 3 is a diagrammatic view illustrating the evolutive thickness distribution. A diagrammatic depiction of the meridionally divided scroll 26 is shown in axial view. The scroll extends spirally about the rotational axis A of the turbine wheel. The angular location denoted as TT is the location where the scroll begins, i.e., the location where the inlets 25a,b (FIG. 1) join with the scroll 26, and this angular location is defined as the 0° angular location. The scroll generally decreases in radius and flow area as it proceeds about the turbine wheel rotational axis, ending substantially at the 360° angular location. Superimposed on the diagrammatic depiction of the scroll are a series of axial-radial cross-sectional views through the scroll taken respectively at a series of angular locations about the turbine wheel rotational axis. Thus, scroll sections are shown at 0°, 45°, 90°, 135°, 180°, 225°, 270°, and 315°. These are merely representative angular locations that have no special significance, the important concept being that the thickness of the dividing wall varies from a maximum value at the 0° location to a minimum value at the 360° location. In the illustrated embodiment, having a V-shaped dividing wall, the included angle $\beta$ correspondingly decreases from the 0° location to the 360° location. Thus, as a non-limiting example, the included angle at the 0° location is 20° and the included angle at the 315° location is 5°. These values for the included angle are merely exemplary, the invention not being limited to any particular values of included angles.

The evolutive thickness distribution for the dividing wall in accordance with the invention can facilitate a number of advantages in comparison with constant-thickness dividing walls. One such benefit is improved thermodynamic and thermomechanical performance of the turbine housing. The invention has benefits particularly for turbines that will operate continuously at high exhaust gas temperatures (e.g., greater than 1000° C.), wherein the turbine housing is constructed from high-grade material.

Persons skilled in the art, on the basis of the present disclosure, will recognize that modifications and other embodiments of the inventions described herein can be made without departing from the inventive concepts described herein. For example, while the illustrated embodiment has a V-shaped dividing wall, the invention is not limited to any particular shape, and dividing walls of other shapes (for example, parabolic or hyperbolic shapes) can be used instead. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger comprising:
   a compressor comprising a compressor housing and a compressor wheel mounted in the compressor housing and connected to a rotatable shaft for rotation therewith;
   a turbine comprising a turbine housing and a turbine wheel mounted in the turbine housing and connected to the rotatable shaft for rotation therewith;
   the turbine housing defining a first inlet and a separate second inlet into which separate first and second exhaust gas streams are respectively received;
   a center housing connected between the compressor housing and the turbine housing and containing bearings for the shaft;
   the turbine housing defining a meridionally divided scroll surrounding the turbine wheel, the first and second inlets joining with the meridionally divided scroll at a location defined as a 0° angular location with respect to a circumferential direction about the turbine wheel, the meridionally divided scroll extending in the circumferential direction from the 0° angular location substantially to a 360° angular location, the meridionally divided scroll defining a first scroll that receives the first exhaust gas stream from the first inlet, and a separate second scroll that receives the second exhaust gas stream from the second inlet;
   a nozzle leading from the meridionally divided scroll generally radially inwardly to the turbine wheel; and
   wherein the turbine housing defines a dividing wall that meridionally divides the first scroll from the second scroll, wherein the dividing wall on any axial-radial cross-sectional plane through the turbine housing and passing through a rotational axis of the turbine wheel has a thickness t and has a V-shape with an included angle β, the thickness T being measured at an average radius $R_{avg}$ of the dividing wall on said cross-sectional plane, wherein said thickness T evolves from a maximum value at the 0° angular location to a minimum value at the 360° angular location and the included angle β evolves from a maximum value at the 0° angular location to a minimum value at the 360° angular location.

* * * * *